C. W. SVENSON.
COASTER BRAKE.
APPLICATION FILED SEPT. 26, 1921.
1,408,842. Patented Mar. 7, 1922.
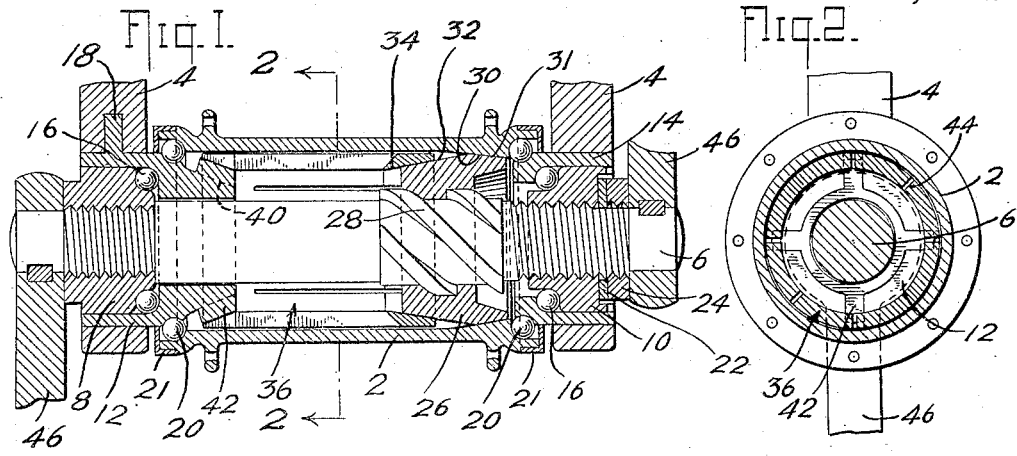
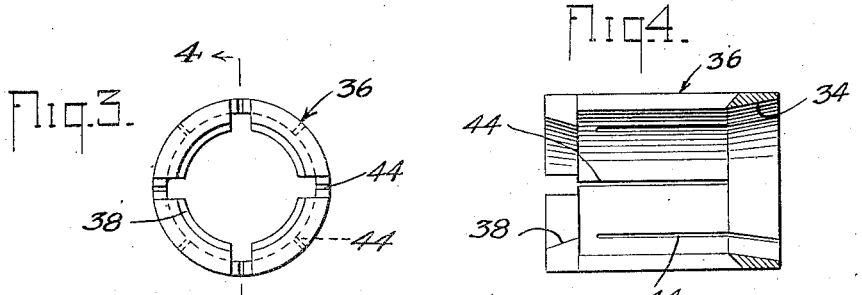
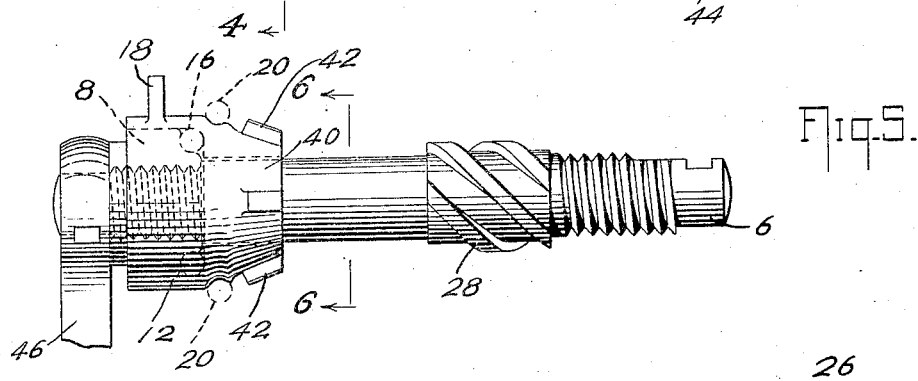
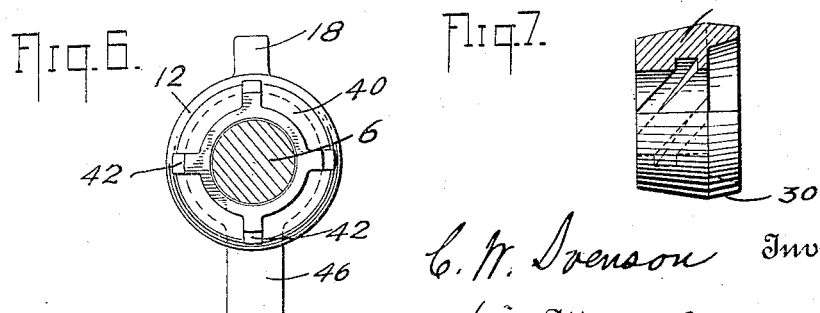
C. W. Svenson, Inventor
By his Attorneys

UNITED STATES PATENT OFFICE.

CHARLES W. SVENSON, OF NEW BRITAIN, CONNECTICUT.

COASTER BRAKE.

1,408,842. Specification of Letters Patent. Patented Mar. 7, 1922.

Application filed September 26, 1921. Serial No. 503,254.

*To all whom it may concern:*

Be it known that I, CHARLES W. SVENSON, a citizen of the United States, residing at New Britain, county of Hartford, State of Connecticut, have invented certain new and useful Improvements in Coaster Brakes, of which the following is a full, clear, and exact description.

The present invention relates to brake mechanisms and has special reference to coaster brakes for velocipedes, bicycles and similar foot propelled vehicles.

An object of the invention is to provide a novel and improved coaster brake.

Another object of the invention is to provide a coaster brake which is particularly adapted for use on velocipedes and other vehicles which are driven by foot pedals directly connected to the ends of a wheel axle.

With these and other objects in view, the features of the invention consist in certain constructions, arrangements and combinations of parts hereinafter described and claimed, the advantages of which will be obvious to those skilled in the art.

The several features of the invention will be clearly understood from the following description and accompanying drawings, in which:

Figure 1 is a longitudinal sectional view taken through the hub of a vehicle wheel, partly in section and with parts broken away, embodying the features of the invention in their preferred form;

Fig. 2 is a transverse sectional view taken on the line 2—2 of Fig. 1;

Fig. 3 is a detail end elevation of a brake shoe constituting a component part of the coaster brake;

Fig. 4 is a sectional view taken on the line 4—4 of Fig. 3;

Fig. 5 is a detail side elevation of the axle of the coaster brake with one of the foot pedals, and a brake member mounted thereon;

Fig. 6 is a sectional view taken on the line 6—6 of Fig. 5; and

Fig. 7 is a detail sectional elevation of a driving clutch member.

The coaster brake is illustrated in the drawings as embodied in a vehicle wheel having a tubular hub 2 which is supported at its ends between frames or forks 4 of the vehicle. The coaster brake is provided with an axle 6 extending axially through the hub and having its ends projecting through the frames. The axle is mounted for rotation in the frames by means of cones 8 and 10 screwed on the ends thereof and arranged within bushings 12 and 14, respectively, ball bearings 16 being interposed between the cones and bushings. The bushings 12 and 14 are mounted in the frames and the bushing 12 is held from both axial and rotative movement by means of a tongue 18 engaging a suitable slot in the frame. The hub 2 is mounted for rotary movement on bushings 12 and 14 by means of ball bearings 20 interposed between the hub and bushings. Annular dust caps 21 are secured to both ends of the hub to close the space between the ends of the hub and the bushings 12 and 14. The cone 10 may be adjusted on the axle to take care of any looseness occurring in the bearings and the cone is locked in place on the axle by means of a washer 22 and a lock nut 24 screw threaded on the end of the axle. The cone 8 is securely held on the axle by being tightly screwed against a shoulder on the axle. A driving clutch member 26 is mounted on the axle within the hub and is connected with the axle by means of right-hand screw threads 28 formed on the axle which engage internal screw threads on the clutch member. The clutch member 26 is provided at one end with a tapering clutch face 30 which is adapted to engage a corresponding clutch face 31 on the interior of the hub when the driving clutch member is shifted toward the right. The driving clutch member is provided at its other end with a tapering face 32 which is adapted to engage a corresponding face 34 on the interior of one end of a tubular brake shoe 36 surrounding the axle when the clutch member is shifted toward the left out of engagement with the hub. The interior of the other end of the brake shoe is provided with a tapering face 38 which is adapted to engage a corresponding face 40 on the inner end of the bushings 12 when the brake shoe is shifted toward the left. The brake shoe 36 is held at all times from rotary movement by lugs 42 on the stationary bushing 12 which are received in slots in the left-hand end of the brake shoe. The brake shoe is provided with two sets of slits 44 extending from opposite ends thereof which enable the brake shoe to be expanded at both ends. The tapering faces of the brake shoe 34, hub 2 and driving clutch member 30 are so arranged that the driving clutch member is in engagement with either the brake shoe or the hub at all times and when the axle is at rest is in engagement with the brake shoe.

With this construction it will be apparent that at the start of the rotation of the axle 6 in a clockwise direction the engagement of the driving clutch member with the brake shoe will tend to hold the clutch member stationary and the screw threads on the axle and driving clutch member will act to shift the driving slutch member to the right out of engagement with the brake shoe and into engagement with the clutch face on the hub to clutch the hub to the shaft; upon stopping the rotation of the axle 6 with relation to the hub 2 the continued rotation of the hub 2 will tend to rotate the driving clutch member on the axle in a direction to cause the screw threads to act to shift the clutch member out of engagement with the hub and lightly into engagement with the brake shoe so that the hub may be rotated independently of the axle; and upon reversing the rotation of the axle 6 with relation to the hub the brake shoe will tend to hold the driving clutch member stationary which will permit the screw threads to shift the driving clutch member farther toward the left a sufficient distance to firmly clutch the axle to the brake shoe and to co-operate with the tapering face of the bushing 12 to expand both ends of the brake shoe against the inner peripheral wall of the hub and hence stop the rotation of the hub and clutch it to the brake shoe.

The tapering face on the left-hand end of the brake shoe 36 is much more abrupt than the tapering face on the right-hand end of the brake shoe so that upon again rotating the axle 6 in a clockwise direction the brake shoe tends to move to the right more than it tends to move to the left and thus to be held in engagement with the driving clutch member 26 until the driving clutch member is brought into engagement with the clutch face of the hub 2.

In the drawings, arms 46 of foot pedals are shown secured on the ends of the axle for the purpose of driving the axle, but it is obvious that the axle may be driven by other devices either connected with both ends or only one end of the axle.

While it is preferred to employ the specific construction and arrangement of parts illustrated and described, it is to be understood that this construction and arrangement is not essential except so far as specified in the claims, and may be changed or modified without departing from the broader features of the invention.

What I claim is:

1. A coaster brake having, in combination, a driven member, a rotatable axle within the driven member, and suitable connections between the driven member and axle acting to connect the driven member and axle upon rotation of the axle in one direction with relation to the driven member, to disconnect the driven member and axle upon stopping the rotation of the axle during the continued rotation of the driven member, and to stop the rotation of the driven member upon reversing the rotation of the axle with relation to the driven member.

2. A coaster brake having, in combination, a driven member, a rotatable axle extending through the driven member with the ends of the axle projecting beyond the ends of the driven member, suitable connections between the driven member and axle acting to connect the driven member and axle upon rotation of the axle in one direction with relation to the driven member, to disconnect the driven member and axle upon stopping the rotation of the axle during the continued rotation of the driven member, and to stop the rotation of the driven member upon reversing the rotation of the axle with relation to the driven member, and driving devices connected with both ends of the axle.

3. A coaster brake having, in combination, a rotatable axle, a driving clutch member mounted on the axle and connected to rotate therewith, a co-operating driven clutch member surrounding said driving clutch member and axle and means acting upon rotation of the axle in one direction to shift the driving clutch member into clutching engagement with the driven clutch member, acting upon stopping the rotation of the axle with relation to the driven clutch member to shift the driving clutch member out of clutching engagement with the driven clutch member, and acting upon reversing the rotation of the axle with relation to the driven clutch member to further shift the driving clutch member away from the driven clutch member, and means acting upon such further shifting movement of the driving clutch member to co-operate with the driving clutch member to stop the rotation of the driven clutch member.

4. A coaster brake having, in combination, a driven member having a clutch face on the interior thereof, an axle extending through the driven member having screw threads thereon, a clutch member mounted on the axle having screw threads engaging said screw threads on the axle and having a clutch face adapted to co-operate with the clutch face on the driven member to connect the driven member and axle when these faces are in engagement, and means co-operating with said screw threads of the clutch member and axle to shift the clutch member in a direction to engage said clutch faces upon rotation of the axle in one direction with relation to the driven member and to shift the clutch member in the opposite direction to disengage said clutch faces upon stopping the rotation of the axle during the continued rotation of the driven member.

5. In a wheel vehicle, the combination of a driven member having a hub, a rotatable axle passing through the hub, means for supporting the hub and axle independently of each other, mechanism connected with the axle for connecting the axle with and disconnecting it from the hub, and a brake for the hub actuated by the axle.

6. A coaster brake having, in combination, a hub, a rotatable axle mounted within the hub and having at least one end extending beyond the hub, a bearing surrounding and supporting said axle, driving means connected with said end of the axle and suitable connections between the hub and axle controllable by the axle for connecting and disconnecting the hub and axle.

CHARLES W. SVENSON.